R. L. RAND.
SPRING SHACKLE.
APPLICATION FILED MAR. 12, 1917.
1,245,025.
Patented Oct. 30, 1917.
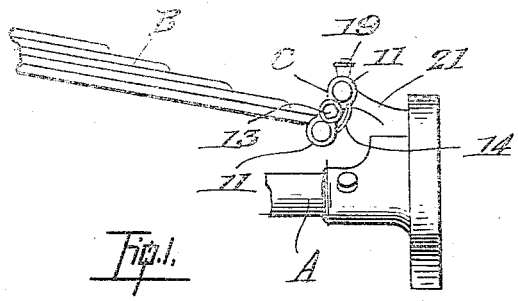
Fig.1.
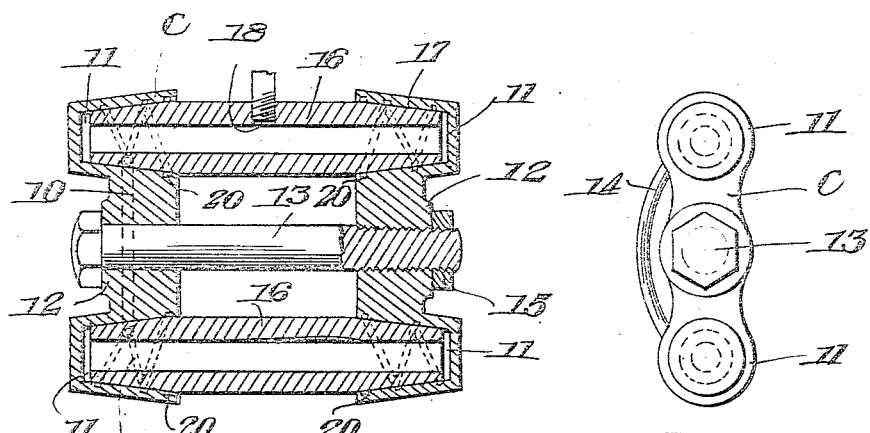
Fig.2.
Fig.3.
Fig.4.
WITNESSES
INVENTOR
R. L. RAND.
BY Featherstonhaugh & Co.
ATTYS.

UNITED STATES PATENT OFFICE.

RUPERT LESLIE RAND, OF AMHERST, NOVA SCOTIA, CANADA.

SPRING-SHACKLE.

1,245,025.

Specification of Letters Patent.

Patented Oct. 30, 1917.

Application filed March 12, 1917. Serial No. 154,304.

*To all whom it may concern:*

Be it known that I, RUPERT LESLIE RAND, a subject of the King of Great Britain, and a resident of the city of Amherst, in the Province of Nova Scotia, Dominion of Canada, have invented certain new and useful Improvements in Spring-Shackles, of which the following is a full description.

This invention relates to improvements in spring shackles for automobiles and like vehicles and the objects of the invention are to facilitate taking up wear and thereby eliminating rattling of the shackles, to permit of a ready lubrication of the shackles, to simplify the several parts and render the same easily accessible for inspection, and generally adapt the shackles to better perform the functions required of them.

For a complete understanding of my invention, reference is made to the accompanying drawings in which, Figure 1 is a fragmentary side elevation of a vehicle spring and axle showing the improved shackle in position.

Fig. 2 is a vertical section through the shackle.

Fig. 3 is an end elevation of the shackle.

Fig. 4 is an elevation of one of the side members of the shackle.

Like characters of reference refer to like parts in the several figures.

Referring to the drawings, A represents an axle, and B a vehicle spring of the automobile type which are operatively connected through the shackle C. This shackle consists of a pair of side members 10, provided on the upper and lower ends with laterally disposed conical cups or depressions 11 formed integral with the boss 12 of the side members through which the bolt 13 passes.

The inner periphery of the cups 11 are recessed to form oil gutters 14ª and these gutters are connected by a pipe or conduit 14 extending between the upper and lower conical cups 11.

In the embodiment illustrated, it will be seen that the orifice through the boss 12 of one of the side members is threaded to engage with the bolt 13, which is secured in position by the lock-nut 15 adapted to prevent or obviate any liability of the bolt slacking.

The cups 11 are designed to engage with the pins 16, which are formed tubular and have the ends reduced or tapered as shown at 17 to tightly engage with the inner wall of the said cups and when these pins are in position there is a clearance left between the bottom of the cup and the ends of the pins to provide for future wear.

The upper pin is provided with an inlet orifice 18 with which the oil cup 19 makes threaded engagement. As the oil is fed through the orifice 18 into the tubular pin 16, the oil passes to each end and enters the side members where it passes freely around the gutter 14 and thoroughly lubricates the joints between the end members and the pin.

It is advisable that this oil should not be permitted to leak from the inner face of the cup, and to this end I provide an annular recess 20, adjacent to the outer edge of the cups and designed to carry a felt washer, so making a tight joint between the said members and the pins and thus preventing dirt from gaining access to the same.

When this shackle is in use, the lower pin is driven tightly into the eyelet of the spring B and the upper pin is driven tightly into the hanger 21 of the axle A, and any movement of the spring B, relatively to the axle A takes place through the movement of the side members 10 relatively to the pins 16.

When this shackle is in use, should any wear take place on the tapered portion of the pins 16, it is only necessary to tighten the bolt 13 which is threaded into one of the side members 10 and will thereby draw the said side members into close engagement with the pins, and so take up any wear which has taken place.

It will be understood that the side members 10 are preferably made of drop forgings so that great strength is given to the same while the tubular pins 16 have their tapered ends hardened to withstand any wear.

From this description it will be seen that I have invented a spring shackle which can be advantageously utilized on automobiles thereby eliminating all rattling which so often occurs in the present method of hanging springs, and at the same time provides a simple and effective means of taking up any wear and of lubricating the several working parts of the shackle.

As many changes could be made in the above description and many apparently widely different embodiments of my invention within the scope of the claims constructed without departing from the spirit or scope thereof, it is intended that all matter contained in the accompanying specification and drawing shall be interpreted as illustrative and not in a limited sense.

What I claim as my invention is:

1. A shackle of the class described, comprising a pair of side members having tapered pockets in the upper and lower ends, and tubular pins extending between the said side members and having tapered ends engaging with the said pockets, said side members having gutters around the inner periphery of the pockets and one of said side members having a conduit operatively connecting the gutters around its upper and lower pockets.

2. A spring shackle of the class described comprising a pair of side members having pockets in the upper and lower ends provided with gutters in the inner walls, tubular pins extending between the side members, having reduced ends engaging with the pockets, each of said pockets having an annular recess therein adapted to carry a washer and means for securing the side members and pins in assembled position.

In witness whereof I have hereunto set my hand in the presence of two witnesses.

RUPERT LESLIE RAND.

Witnesses:
H. W. ROGERS,
A. G. MACKENZIE.